Oct. 14, 1958  E. R. GIEZENDANNER  2,856,561
STATIC ELECTRICITY METHOD AND APPARATUS
Filed April 22, 1957

EDWIN R. GIEZENDANNER
INVENTOR.

BY Fulwider, Mattingly
and Huntley
ATTORNEYS.

United States Patent Office 2,856,561
Patented Oct. 14, 1958

2,856,561

STATIC ELECTRICITY METHOD AND APPARATUS

Edwin R. Giezendanner, Long Beach, Calif.

Application April 22, 1957, Serial No. 654,234

4 Claims. (Cl. 315—55)

This invention relates to static-electricity method and apparatus and more particularly to such method and apparatus which may be employed to utilize static electricity to perform various functions.

It has previously been proposed to generate a charge of electricity by rubbing objects of two dissimilar substances against each other. Such electricity has been called friction electricity and static electricity. One classical method of generating static electricity is to rub a piece of silk cloth against a glass rod. Of course the generation of static electricity is not limited to rubbing silk against glass, but results from rubbing a great variety of materials together, e. g., rubber, sulphur, amber, etc.

Methods of generating static electricity have been known for many, many years; however, the uses of this form of electrical energy have been quite limited. One practical utilization of static electricity in the past has been to generate high voltages by accumulating charges of static electricity. High voltages generated in this manner have found practical application as in charged particle accelerators; however, in the past, static electricity has been primarily a laboratory curiosity.

The present invention contemplates generating charges of static electricity and utilizing such charges in connection with a confined atmosphere. Such charges may thus be employed to directly produce light and to generate usable electrical potential energy.

It is therefore a major object of this invention to provide an improved method and means for utilizing static electricity.

Another object of this invention is to provide a simple method and means for generating electrical potential energy.

Still another object of this invention is to provide a novel method and means for producing light from static electricity.

A further object of this invention is to provide a simple and inexpensive method and apparatus for converting kinetic energy into light.

A still further object of this invention is to provide an educational toy which can be motivated by hand to produce light.

These and other objects and advantages of the present invention will become apparent from the following detailed description when taken in conjunction with the appended drawing wherein.

Figure 1:
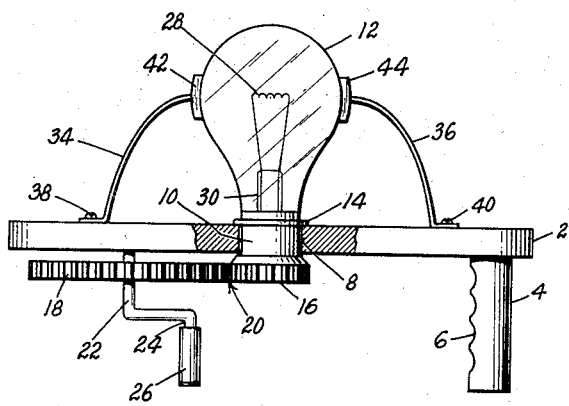
Figure 1 is a part sectional, part perspective view of one form of light-producing apparatus constructed in accordance with the principles of this invention.

Referring now first to Figure 1, there is shown a frame member 2, incorporating a handle 4. The handle 4 is fashioned into a grip by the provision of recesses, e. g. recess 6. The body of the frame member may be formed of light metal and may have a circular configuration. A bearing surface 8 is formed upon the edges of a bore centrally located in the frame member 2. A bearing surface 10 is positioned to mate with the bearing surface 8. The bearing surface 10 is formed about the base of a bulb 12. In one operating embodiment the bulb 12 has been formed of clear glass and constituted an ordinary incandescent light bulb; however, it is to be appreciated that any of the various material conducive to the generation of static electricity may be used.

A flange 14 is formed at the base of the bulb 12 to maintain the position of the bulb above the frame 2. At the bottom of the base of the bulb 12 is formed a pinion 16. The pinion 16 engages a gear wheel 18 to form a gear 20. The gear wheel 18 is mounted in fixed manner upon a shaft 22. One end of the shaft 22 is rotatively mounted in the frame member 2. That is, the end of the shaft 22 is formed into a flange (not shown) held in the frame 2, so as to prevent axial movement of the shaft 22. The other end of the shaft 22 is formed into a crank 24, including a handle 26.

Inside the bulb 12 is a filament 28 which may be formed of metallic wire. The filament 28 is supported by a glass base 30, just as in conventional light bulbs. The bulb 12 is sealed to preserve an atmosphere therein. In various operating embodiments, inert gases have been introduced within the bulb 12 to constitute the atmosphere, just as in conventional incandescent light bulbs.

Affixed to the frame member 2 are two leaf springs 34 and 36. These springs may be affixed to the frame 2 by rivets 38 and 40. At the ends of the leaf springs 34 and 36 which are remote from the frame 2, contacts 42 and 44 are mounted. These contacts are firmly attached to the springs 34 and 36, but are only urged against the bulb 12, so that the bulb may be rotated. These contacts may be made of many materials some of which are: brass, aluminum, copper, leather, rubber, silk and paper.

To operate the apparatus of Figure 1, the handle 4 is firmly held in one hand while the small handle 26 is moved in a circular fashion with the other hand. This operation causes the gear wheel 18 to revolve, which in turn drives the pinion 16 at a faster rate. The pinion 16 is affixed to the bulb 12, therefore as the pinion revolves, the bulb is revolved in the bore of the frame 2. As the bulb is so revolved, illuminating electrical discharges occur within the bulb 12. Most of such discharges appear to occur between the glass walls of the bulb 12 and the filament 28; however, some discharges also appear to occur between locations on the interior of the bulb. In fact, these latter discharges probably do occur because the apparatus as shown in Figure 1, is operative without the filament 28 in another embodiment. In such an embodiment all discharges occur between locations on the inner surface of the bulb 12.

As for the intensity and color of the electrical discharges in the bulb 12, these vary with the materials employed, the physical dimensions, and the atmosphere within the bulb 12. One combination of materials which provides an interesting discharge consists of neon gas in the bulb 12, contacts 42 and 44 formed of rubber and a spacing of some one and one-half inches between the filament 28 and the nearest surface of the bulb 12, which is formed of glass.

The manner in which the static charge of electricity, formed by the contacts 42 and 44 rubbing against the bulb 12, effects illumination is not completely understood. However, it appears that the illuminations results from an electrical discharge current through the atmosphere in the bulb 12, which dissipates the static charges developed on the bulb.

Figure 2:
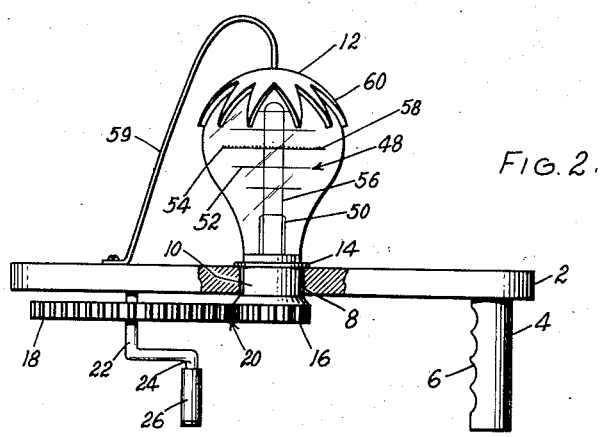
Figure 2 is a part sectional, part perspective view of another form of light-producing apparatus constructed in accordance with the principles of this invention.

Reference will now be had to Figure 2, wherein parts similar to parts of Figure 1 carry like reference numerals.

The bulb 12 of Figure 2 contains a structure 48 held by a glass mounting 50. The structure 48 consists of a number of plates, e. g. 52 and 54, positioned upon a support 56. The plates, e. g. 52 and 54 may be formed of copper or other metals. Attached to the plate 54 is a layer 58 of metal filings, e. g. iron filings. These filings render the surface of the plate 54 irregular and result in a very interesting lighting effect.

A leaf spring 59 is attached to the frame member 2, and carries a contact 60. The contact 60 has a many prong star configuration, and is molded to conform to the surface of the bulb 12. This contact may be made of a variety of materials similar to the contacts 42 and 44. The bulb 12 of Figure 2, as the bulb in the apparatus of Figure 1, may be formed of glass and may contain helium neon, argon, mercury, vapor or various other gases.

The operation of the apparatus of Figure 2 is similar to that of Figure 1. The handle 4 is held in one hand while the small handle 26 is turned. As the handle 26 is turned the gear wheel 18 is revolved through the crank 24. The gear wheel 18 is engaged with the pinion 16, therefore as the gear wheel 18 revolves, the pinion 16 revolves at a higher rate. The pinion 16 is integral with the bulb 12; therefore the bulb is revolved with respect to the contact 60. This relative motion apparently generates charges of static electricity which are dissipated by electrical discharges in the bulb 12. As a result, the bulb 12 is illuminated.

The electrical discharges in the bulb 12 of Figure 2 appear to occur primarily between the peripheries of the plates, e. g. 52 and 54 and the bulb 12.

Figure 3:
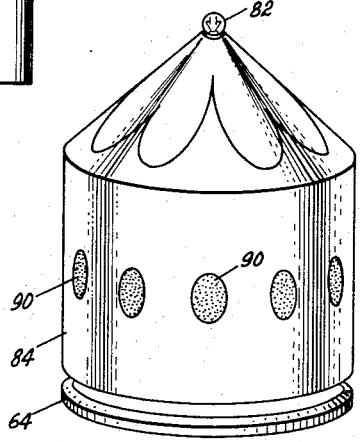
Figure 3 is a perspective view of a light-producing toy embodying certain principles of this invention.
Figure 4:
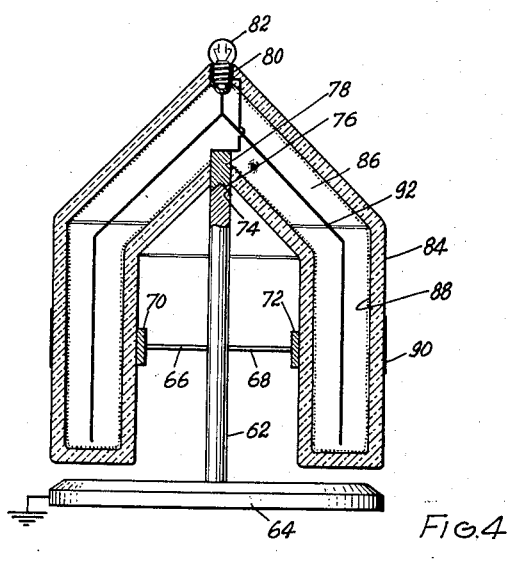
Figure 4 is a vertical sectional view taken along the diameter of the circular form of Figure 3.

Reference will now be had to Figures 3 and 4 which show a toy incorporating certain features of this invention. A vertical shaft 62 is mounted upon a base 64. Springs 66 and 68 are attached to the shaft 62, and contacts 70 and 72 are attached at the ends of the springs.

The shaft 62 terminates in a bearing surface 74. An indented bearing surface 76 of a short rod 78 engages the bearing surface 74. The rod 78 is electrically connected to a socket 80 adapted to receive a gas-discharge bulb 82.

The socket 80 and the rod 76 are formed integral with an enclosure 84. The enclosure 84 is formed in a tent-like shape and has two walls which are sealed to form a chamber 86. The chamber may contain various gases as previously explained. The enclosure may be formed of glass as bulb 12, or of more durable similar static-electricity materials. The interior surfaces of the enclosure 84, i. e. within the chamber 86 are coated with fluorescent material 88, e. g. magnesium tungstate, as variously used in lighting tubes. Ornamentation as ovals 90 may be painted on the external surface of the enclosure 84.

An electrode 92 is mounted within the enclosure 84 in the chamber 86. This electrode may take various shapes but it is normally formed of metal. The electrode 92 is electrically connected to the socket 80 to form a serial circuit from the electrode 92, through the bulb 82, the rod 76, and the shaft 62 to the base 64. It is to be noted that the base 64 is normally held at ground potential.

To operate the toy of Figures 3 and 4, the enclosure 84 is revolved so that there is relative motion between the bearing surfaces 74 and 76. The result of so revolving the enclosure 84 is to effect a relative motion between the contacting surfaces of the enclosure 84 and the contacts 70 and 72. Static electricity is thereby generated on the enclosure 84. The effect of this static electricity is to form electrical discharges within the chamber 86. These discharges excite the fluorescent material 88 and an exceedingly interesting and fascinating light effect results.

As the electrical discharges continue, an electrical charge of potential energy is accumulated on the electrode 92. This charge eventually reaches a magnitude sufficient to exceed the threshold voltage of the light bulb 82 and an electrical discharge occurs therein causing a flash of light. Such a flash results from the dissipation of the voltage on the electrode 92 by a current passing through the bulb 82, the rod 78, the shaft 62 and the base 64 to ground.

It may therefore be seen that the principles of this invention may be applied to withdraw electrical energy from an apparatus, as well as to generate light. Thus the apparatus of Figures 3 and 4 actually constitute an electric generator for developing electrical energy which may be used to excite various electrical apparatus, e. g. the bulb 82.

It may also be seen that this invention provides a method and apparatus which may be applied to create interesting and functional effects, whereby static electricity is utilized. Of course in various applications of the invention different materials may be utilized, many of which have not been enumerated herein due to the vast number of possibilities.

Various modifications and changes may be made with respect to the foregoing detailed description without departing from the spirit of my invention or the scope of the following claims.

I claim:

1. An illuminated toy, comprising: an enclosure having a pair of walls forming a chamber therebetween, and a fluorescent coating disposed upon the inside of said chamber; an electrode positioned within said chamber; and contact means in engagement with said enclosure, whereby relative motion between said contact means and said enclosure produces a charge of static electricity which discharges in said chamber to produce light.

2. A light-generating toy, comprising: a structure having an internal wall and an external wall and having a shape to form a partial enclosure, said internal and external walls being sealed together to provide a chamber; contact means positioned within said partial enclosure in contact with said internal wall; and mounting means for supporting said structure relative to said contact means to allow movement therebetween for generating a charge of static electricity to discharge in said chamber to provide light.

3. An apparatus according to claim 2 further comprising an electrode positioned in said chamber to have an effect upon discharges of static electricity in said chamber.

4. An apparatus according to claim 2 further comprising a coating of fluorescent material disposed upon a surface of one of said walls adjacent said chamber.

References Cited in the file of this patent

UNITED STATES PATENTS 2,649,566   Morel _____ Aug. 18, 1953

FOREIGN PATENTS 108,927      Germany _____ June 19, 1898
122,660      Great Britain _____ Mar. 28, 1912
1,014,895    France _____ Mar. 23, 1951